(12) United States Patent
Cobb et al.

(10) Patent No.: US 11,069,982 B2
(45) Date of Patent: Jul. 20, 2021

(54) ANECHOIC CHAMBER AND METHOD OF CALIBRATING A RADAR SYSTEM

(71) Applicant: Honda Motor Co., Ltd., Tokyo (JP)

(72) Inventors: Derrick I. Cobb, Delaware, OH (US); David B. Betz, West Jefferson, OH (US); Brian D. Ayers, Hilliard, OH (US); Robert Mark Ziccardi, Marysville, OH (US)

(73) Assignee: HONDA MOTOR CO., LTD., Tokyo (JP)

( * ) Notice: Subject to any disclaimer, the term of this patent is extended or adjusted under 35 U.S.C. 154(b) by 326 days.

(21) Appl. No.: 16/238,125

(22) Filed: Jan. 2, 2019

(65) Prior Publication Data

US 2020/0212589 A1 Jul. 2, 2020

(51) Int. Cl.
*H01Q 17/00* (2006.01)
*G01S 7/40* (2006.01)

(52) U.S. Cl.
CPC ............ *H01Q 17/00* (2013.01); *G01S 7/40* (2013.01); *G01S 7/4008* (2013.01)

(58) Field of Classification Search
CPC ..... G01R 29/105; G01R 29/0821; G01S 7/40; G01S 2007/4082; G01S 2207/4086; G01S 13/931; H01Q 17/00
See application file for complete search history.

(56) References Cited

U.S. PATENT DOCUMENTS

| | | | | |
|---|---|---|---|---|
| 3,165,742 A | * | 1/1965 | Taylor | G01S 7/4017 342/169 |
| 3,199,107 A | * | 8/1965 | Mills | G01S 7/40 342/170 |
| 3,254,340 A | * | 5/1966 | Sealander | G01S 7/4021 342/169 |
| 4,218,683 A | * | 8/1980 | Hemming | H01Q 19/022 343/703 |
| 4,463,329 A | | 7/1984 | Suzuki | |
| 4,467,327 A | * | 8/1984 | Drake | F41G 7/003 342/172 |

(Continued)

FOREIGN PATENT DOCUMENTS

| | | |
|---|---|---|
| CN | 202119806 U | 1/2012 |
| CN | 103728603 A | 4/2014 |

(Continued)

OTHER PUBLICATIONS

Abdullah et al., "Design of Portable Mini Anechoic Chamber Using Low Cost Composite Absorber", Nov. 11-18, 2009, pp. 526-528, Publisher: Proceedings of 2009 IEEE Student Conference on Research and Development, Published in: UPM Serdang, Malaysia. (Year: 2009).*

(Continued)

*Primary Examiner* — Peter M Bythrow
(74) *Attorney, Agent, or Firm* — Armstrong Teasdale LLP

(57) ABSTRACT

A portable anechoic chamber is described herein. The chamber includes a housing including an interior, and the housing defines an opening sized to provide access to the interior. A layer of radar absorbent material lines the interior, and a reflective device is positioned within the interior. The reflective device is positioned to receive and reflect a radar beam emitted from a radar source.

18 Claims, 3 Drawing Sheets

(56) References Cited

U.S. PATENT DOCUMENTS

| | | | | |
|---|---|---|---|---|
| 4,560,987 | A * | 12/1985 | Dochow | G01S 7/4052 |
| | | | | 342/171 |
| 4,621,265 | A * | 11/1986 | Buse | F41G 7/003 |
| | | | | 250/252.1 |
| 4,947,175 | A * | 8/1990 | Overholser | G01S 7/4052 |
| | | | | 342/165 |
| 5,117,230 | A * | 5/1992 | Wedel, Jr. | F42C 13/042 |
| | | | | 342/169 |
| 5,892,479 | A * | 4/1999 | Mills | G01S 7/4052 |
| | | | | 342/169 |
| 5,920,281 | A | 7/1999 | Grace | |
| 6,114,985 | A * | 9/2000 | Russell | G01S 7/4052 |
| | | | | 342/169 |
| 6,636,172 | B1 * | 10/2003 | Prestl | G01S 7/4026 |
| | | | | 342/173 |
| 6,700,531 | B2 | 3/2004 | Abou-Jaoude et al. | |
| 7,609,164 | B2 * | 10/2009 | Yamashita | G06K 7/10465 |
| | | | | 340/10.42 |
| 7,667,467 | B2 * | 2/2010 | Khosravi | G01R 29/105 |
| | | | | 324/638 |
| 8,330,640 | B2 * | 12/2012 | Liu | G01R 29/0864 |
| | | | | 342/1 |
| 8,344,932 | B2 * | 1/2013 | Liu | H01Q 1/526 |
| | | | | 342/1 |
| 8,786,502 | B2 * | 7/2014 | Ho | G01R 31/002 |
| | | | | 343/703 |
| 9,244,105 | B2 * | 1/2016 | Aubin | G01R 29/10 |
| 9,276,325 | B2 * | 3/2016 | Sim | H01Q 17/00 |
| 9,319,908 | B2 * | 4/2016 | Nickel | G01R 29/10 |
| 10,054,623 | B2 * | 8/2018 | Estebe | G01R 29/10 |
| 10,404,384 | B1 * | 9/2019 | Mellein | H04B 17/0085 |
| 10,613,198 | B2 * | 4/2020 | Vacanti | G01S 7/4056 |
| 10,641,808 | B2 * | 5/2020 | Rowell | G01R 29/0878 |
| 10,826,624 | B1 * | 11/2020 | Lin | H04W 4/80 |
| 2002/0105456 | A1 * | 8/2002 | Isaji | G01S 7/4026 |
| | | | | 342/165 |
| 2005/0059355 | A1 * | 3/2005 | Liu | H04B 17/391 |
| | | | | 455/67.14 |
| 2006/0164295 | A1 * | 7/2006 | Focke | G01S 13/867 |
| | | | | 342/174 |
| 2007/0217618 | A1 * | 9/2007 | Yang | H04R 29/001 |
| | | | | 381/58 |
| 2013/0110314 | A1 * | 5/2013 | Stieff | G01S 7/4026 |
| | | | | 701/1 |
| 2014/0300519 | A1 * | 10/2014 | Estebe | G01R 29/10 |
| | | | | 343/703 |
| 2017/0003141 | A1 * | 1/2017 | Voeller | G01C 25/00 |
| 2018/0052223 | A1 * | 2/2018 | Stieff | G01B 11/14 |
| 2018/0306904 | A1 * | 10/2018 | Vacanti | G01S 7/4056 |

FOREIGN PATENT DOCUMENTS

| | | |
|---|---|---|
| EP | 3182619 A1 | 6/2017 |
| JP | H11118912 A | 4/1999 |

OTHER PUBLICATIONS

"Target Simulator for Collision Avoidance Radar (short range) Passive Radar Test System (Passive RTS)"; Product Information; Keycom Characteristics Technologies; available at http://www.keycom.co.jp/eproducts/rat/rat09/page.html; last visited Jan. 2, 2019; 5 pp.

* cited by examiner

United States Patent US 11,069,982 B2

ANECHOIC CHAMBER AND METHOD OF CALIBRATING A RADAR SYSTEM

BACKGROUND

The present disclosure relates generally to radar systems and, more specifically, to devices and methods for use in calibrating a radar system.

At least some known modern vehicles use sensor technology to detect objects surrounding a region of a host vehicle. For example, an adaptive cruise control system can include laser or radar sensors to detect the movement of surrounding vehicles and objects. The laser or radar sensors require precise alignment and calibration for the adaptive cruise control system to function properly. For example, one known method of calibrating a radar sensor includes emitting a radar beam towards a radar reflector positioned a distance from the radar sensor. The radar reflector simulates an object that needs to be detected during normal radar operations. Both the radar sensor and the host vehicle may be positioned within a structure lined with radar absorbent material along with the radar reflector during the calibration process. Although the radar absorbent material facilitates reducing unwanted radar interference, generally known structures have a large physical footprint and may be costly to manufacture. In addition, future laser or radar sensors are being designed to detect objects at increasingly farther distances from the host vehicle. However, radar sensors are typically installed and calibrated on the host vehicle on a manufacturing line, which makes it difficult to calibrate the radar sensors in a limited space and/or a cost-effective manner.

BRIEF DESCRIPTION

In one aspect, a portable anechoic chamber is provided. The chamber includes a housing including an interior, and the housing defines an opening sized to provide access to the interior. A layer of radar absorbent material lines the interior, and a reflective device is positioned within the interior. The reflective device is positioned to receive and reflect a radar beam emitted from a radar source.

In another aspect, a method of calibrating a radar system is provided. The method includes positioning a radar source of the radar system and a reflective device of at least one anechoic chamber a physical distance from each other. The at least one anechoic chamber includes a housing including an interior, and the housing defines an opening sized to provide access to the interior. A layer of radar absorbent material lines the interior, and the reflective device is positioned within the interior. The reflective device is positioned to receive and reflect a radar beam emitted from the radar source. The method also includes orienting the housing such that line of sight is provided between the radar source and the reflective device through the opening, and performing a calibration sequence for the radar source.

In yet another aspect, a radar calibration system is provided. The system includes a movable unit, and an anechoic chamber coupled to the movable unit. The anechoic chamber includes a housing including an interior, and the housing defines an opening sized to provide access to the interior. A layer of radar absorbent material lines the interior, and a reflective device is positioned within the interior. The reflective device is positioned to receive and reflect a radar beam emitted from a radar source.

DETAILED DESCRIPTION

The embodiments described herein relate generally to devices and methods for use in calibrating a vehicle radar system. More specifically, the device described herein is an anechoic chamber that includes a housing, radar absorbent material lining the interior of the housing, and a reflective device positioned within the interior. The anechoic chamber has a physical footprint that enables the chamber to be portable such that the chamber may be selectively positioned relative to an individual radar source installed on a vehicle, for example. When positioned in a desired location, the chamber is used to facilitate calibrating the individual radar source. For example, the reflective device simulates an object to be detected during the calibration sequence, and the radar absorbent material facilitates restricting an amount of interference reflected from within the chamber. In addition, the reduced size of the physical footprint of the chamber enables it to be used at locations with limited spatial constraints, such as a manufacturing line or a repair bay of a shop or dealership. In one embodiment, the reflective device is an analog delay module that adjusts a frequency of a received radar beam such that a perceived distance between the reflective device and the radar source is greater than a physical distance therebetween. As such, the devices and methods described herein facilitate calibrating a radar system in a space-saving, cost-efficient, and adaptable manner that is easily repeatable.

Figure 1:
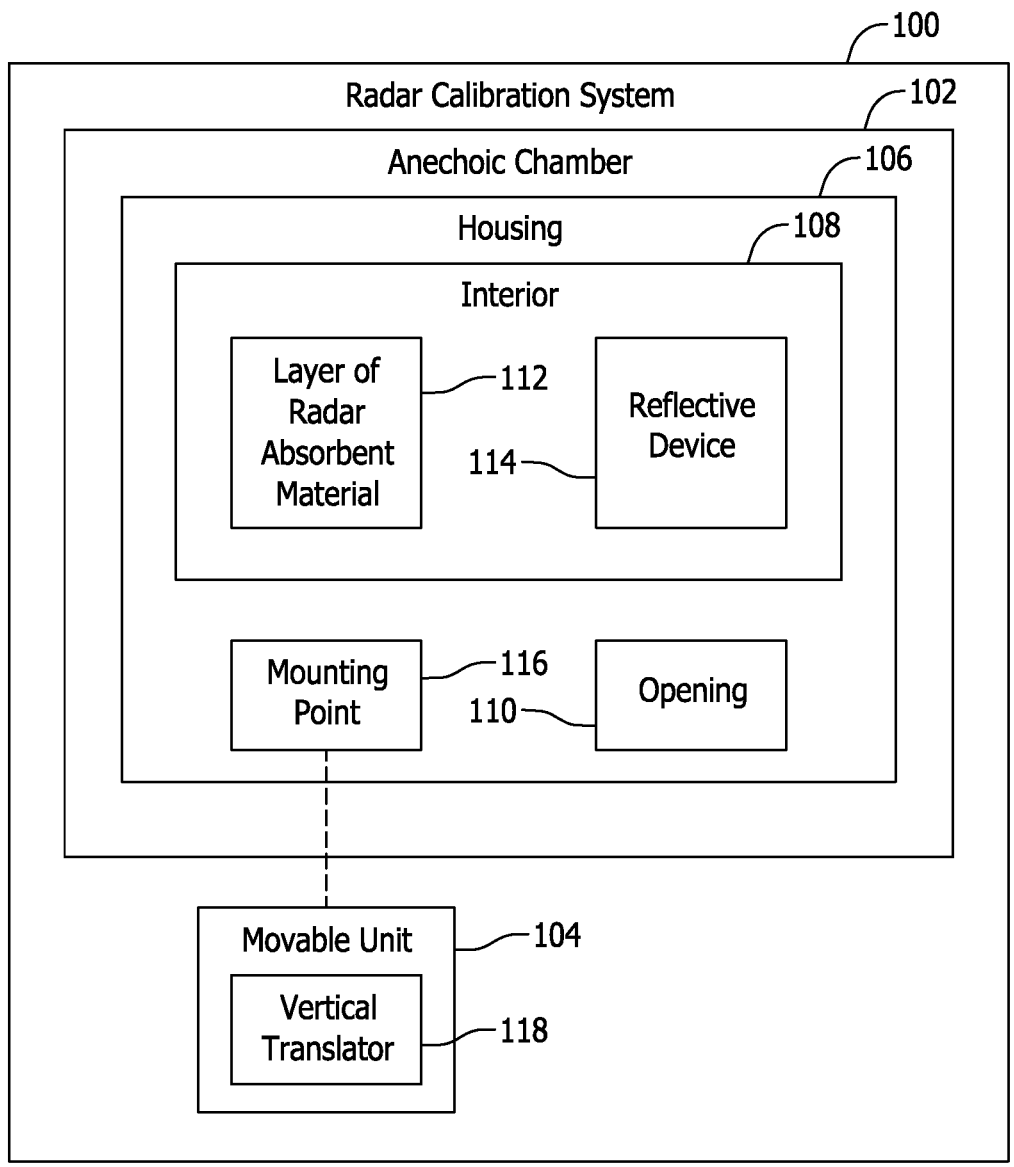
FIG. 1 is a box diagram of an exemplary radar calibration system.
Figure 2:
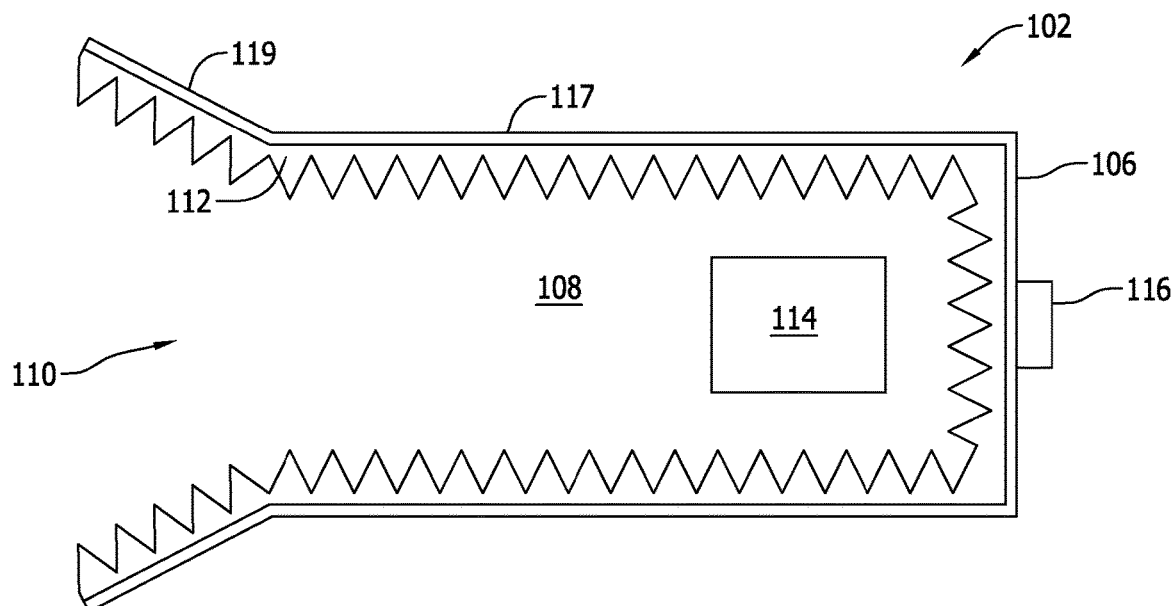
FIG. 2 is a cross-sectional illustration of an exemplary anechoic chamber that may be used in the radar calibration system shown in FIG. 1.

Referring to FIGS. 1 and 2, an exemplary radar calibration system 100 includes an anechoic chamber 102 and a movable unit 104 selectively coupled to anechoic chamber 102. Anechoic chamber 102 includes a housing 106 having an interior 108, and housing 106 defining an opening 110 sized to provide access to interior 108. Anechoic chamber 102 also includes a layer 112 of radar absorbent material lining interior 108, and a reflective device 114 positioned within interior 108. Opening 110 is oriented to provide line of sight from at least one point exterior of housing 106 to reflective device 114 positioned within interior 108. The radar absorbent material may be any material that enables radar calibration system 100 to function as described herein. For example, in one embodiment, the radar absorbent material may be a foam material, and layer 112 may be arranged in a pyramidal configuration to facilitate reducing reflections emitted from layer 112.

Reflective device 114 may be any device that enables radar calibration system 100 to function as described herein. In one embodiment, reflective device 114 is a tetrahedral reflective device or a flat plate reflective device. In operation, as will be explained in more detail below, a calibration distance is defined between reflective device 114 and a radar source (not shown in FIGS. 1 and 2) to facilitate performance of a calibration sequence for the radar source. The tetrahedral reflective device and the flat plate reflective device facilitate reflecting radar beams without adjusting their frequency such that the calibration distance and a physical distance defined between reflective device 114 and the radar source are one and the same. In an alternative embodiment, reflective device 114 is an analog delay module. The analog delay module enables a frequency of a radar beam received from the radar source to be adjusted such that a perceived distance between the radar source and reflective device 114 is greater than the physical distance. In one embodiment, the frequency of the radar beam is adjusted such that the perceived distance and the calibration distance are approximately equal.

Housing 106 also includes a mounting point 116. In the exemplary embodiment, radar calibration system 100 includes a movable unit 104 that is removably coupled to anechoic chamber 102. In one embodiment, mounting point 116 enables housing 106 to be coupled to movable unit 104, either releasably or permanently. In addition, movable unit 104 may be any mobile platform that enables radar calibration system 100 to function as described herein. For example, movable unit 104 may be a six-axis robot or a wheeled mobile platform. The wheeled mobile platform may be moved to different positions manually by an operator or with the assistance of a motorized device. In addition, in one embodiment, movable unit 104 includes a vertical translator 118 for moving anechoic chamber 102 in a Z-direction relative to the floor. Exemplary vertical translators include, but are not limited to, a pneumatic translator, a hydraulic translator, and the like. As such, movable unit 104 facilitates selectively positioning anechoic chamber 102 relative to, and for alignment with, the radar source.

For example, housing 106 may be any size and shape that enables radar calibration system 100 to function as described herein. In the exemplary embodiment, housing 106 includes a side wall 117 and a side wall extension 119 oriented obliquely relative to side wall 117. Side wall extension 119 defines opening 110. As such, opening 110 has a greater cross-sectional area than interior 108 to facilitate enhancing the ability to receive and transmit radar beams through opening 110. In addition, the size and shape of housing 106 is selected to enable anechoic chamber 102 to be portable without disassembly, and to be positioned at one or more locations about the radar source. In one embodiment, housing 106 has dimensions of less than about 1 meter in height, length, and width, and interior 108 has a volumetric capacity of less than about 1 cubic meter.

Figure 3:
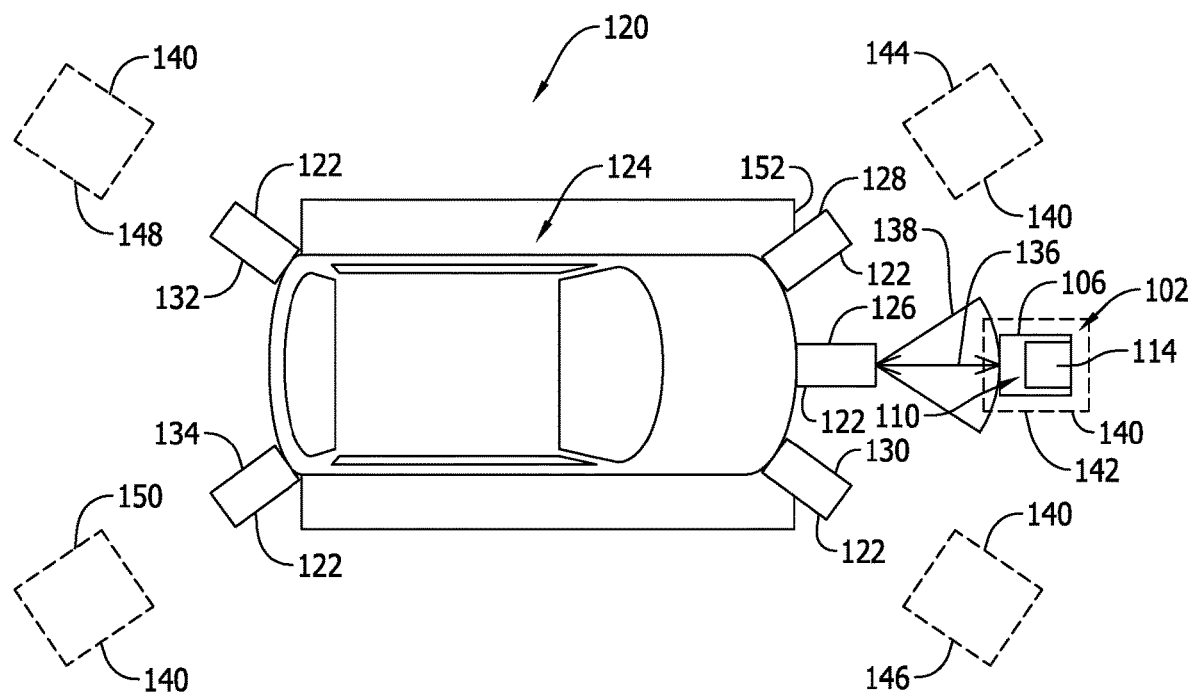
FIG. 3 illustrates an exemplary method of calibrating a radar system using the radar calibration system shown in FIG. 1.

FIG. 3 illustrates an exemplary method of calibrating a radar system 120. In the exemplary embodiment, radar system 120 includes a plurality of radar sources 122 installed on a vehicle 124. For example, radar sources 122 include first, second, third, fourth, and fifth radar sources 126, 128, 130, 132, and 134. More specifically, first, second, and third radar sources 126, 128, and 130 are forward-facing detectors, and fourth and fifth radar sources 132 and 134 are rearward-facing detectors. Each radar source 122 is oriented in a different direction relative to vehicle 124. In an alternative embodiment, radar system 120 may be installed on any suitable platform.

The method includes positioning one of radar sources 122, such as first radar source 126, of radar system 120 and reflective device 114 of at least one anechoic chamber 102 at a physical distance 136 from each other. Housing 106 is oriented for alignment with first radar source 126 such that line of sight is provided between first radar source 126 and reflective device 114 through opening 110 in housing 106. In addition, housing 106 is aligned with first radar source 126 such that the center of a field of view 138 of first radar source 126 is aligned with the center of reflective device 114. A calibration sequence is then performed for first radar source 126. For example, in one embodiment, radar source 122 or vehicle 124 is set to a diagnostics mode to facilitate initiating software filtering and calibration of the radar window for use in detecting objects when vehicle 124 is in use. The calibration sequence may be repeated for each additional radar source 122 installed on vehicle 124.

As noted above, a calibration distance is defined between reflective device 114 and first radar source 126 to facilitate performance of a calibration sequence for first radar source 126. The calibration distance is predefined, and is any distance that enables the calibration sequence to be performed, as described above. For example, the calibration distance may be up to about 6 meters in length. In one embodiment, the calibration distance and physical distance 136 are approximately equal if reflective device 114 does not adjust a frequency of a radar beam emitted from first radar source 126. Alternatively, reflective device 114 enables a frequency of the radar beam emitted from first radar source 126 to be adjusted such that a perceived distance, greater than physical distance 136, is defined between reflective device 114 and first radar source 126. In the exemplary embodiment, the frequency is adjusted such that the perceived distance is approximately equal to the calibration distance. As such, reflective device 114 enables physical distance 136 to be reduced, thereby reducing an amount of physical space required for performing the calibration sequence.

In one embodiment, the positioning step of the method includes moving at least one anechoic chamber 102 relative to the plurality of radar sources 122. For example, a plurality of calibration locations 140 are defined about vehicle 124. The plurality of calibration locations 140 include a first calibration location 142 aligned with first radar source 126, a second calibration location 144 aligned with second radar source 128, a third calibration location 146 aligned with third radar source 130, a fourth calibration location 148 aligned with fourth radar source 132, and a fifth calibration location 150 aligned with fifth radar source 134. In operation, the at least one anechoic chamber 102 is mounted to movable unit 104 (shown in FIG. 1), and movable unit 104 is used to move anechoic chamber 102 to the plurality of calibration locations 140. As such, the calibration sequence may be performed without moving vehicle 124.

In an alternative embodiment, the positioning step of the method includes moving radar source 122 relative to reflective device 114. For example, vehicle 124 may be moved to a predetermined location 152, and a plurality of anechoic chambers 102 may be positioned about predetermined location 152. More specifically, in one embodiment, each calibration location 140 is defined at a fixed location relative to predetermined location 152, and at least one anechoic chamber 102 is positioned at the fixed locations such that the calibration sequence for each radar source 122 may be performed simultaneously when vehicle 124 is at predetermined location 152. The predetermined location 152 may be defined along a manufacturing line or in a repair bay, for example. In addition, in one embodiment, one or more of anechoic chambers 102 at calibration locations 140 are retractable within a floor of the manufacturing line or repair bay, for example. As such, the retractability of anechoic chambers 102 facilitates free movement of vehicle 124 relative to predetermined location 152, such as before and after the calibration sequence is completed.

Figure 4:
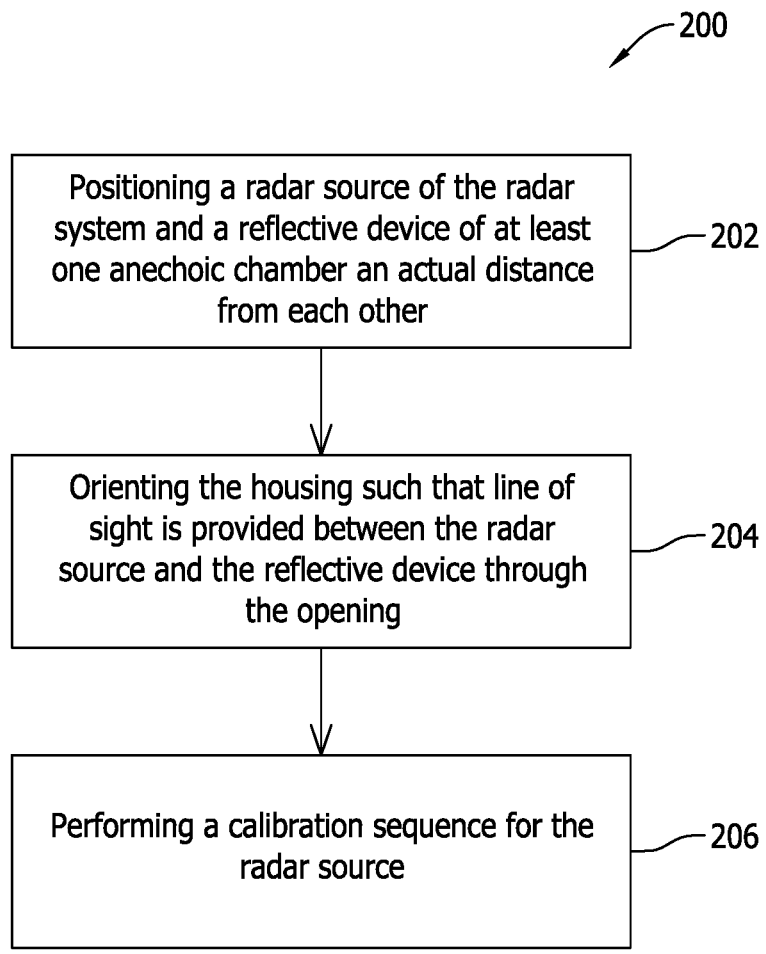
FIG. 4 is a flow diagram illustrating an exemplary method of calibrating the radar system.

FIG. 4 is a flow diagram illustrating an exemplary method 200 of calibrating radar system 200. In the exemplary embodiment, method 200 includes positioning 202 a radar source of the radar system and a reflective device of at least one anechoic chamber a physical distance from each other, orienting 204 the housing such that line of sight is provided between the radar source and the reflective device through the opening, and performing 206 a calibration sequence for the radar source.

The embodiments described herein relate to an anechoic chamber that may be used to calibrate an object-detecting radar system installed on a vehicle, for example. The anechoic chamber is sized to be portable for selectively positioning the chamber for alignment with a radar source. In addition, radar absorbent material lining the chamber facilitates reducing emission of reflected noise from within the chamber. As such, a radar calibration sequence may be performed in a space-saving, cost-efficient, and adaptable manner.

Exemplary embodiments of a radar calibration system are described above in detail. Although the systems herein described and illustrated in association with a motor vehicle, the invention is also intended for use on any means of conveyance including a radar system. Moreover, it should also be noted that the components of the invention are not limited to the specific embodiments described herein, but rather, aspects of each component may be utilized independently and separately from other components and methods of assembly described herein.

This written description uses examples to disclose various embodiments, including the best mode, and also to enable any person skilled in the art to practice the various implementations, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A portable anechoic chamber comprising:
    a housing comprising an interior, the housing defining an opening sized to provide access to the interior;
    a layer of radar absorbent material lining the interior; and
    a reflective device positioned within the interior, wherein the reflective device is positioned to receive and reflect a radar beam emitted from a radar source, and wherein the reflective device comprises an analog delay module that adjusts a frequency of the radar beam.

2. The portable anechoic chamber in accordance with claim 1, wherein the analog delay module is configured to receive the radar beam from the radar source that is spaced a physical distance from the reflective device, and wherein the analog delay module adjusts the frequency of the radar beam such that a perceived distance between the radar source and the reflective device is greater than the physical distance.

3. The portable anechoic chamber in accordance with claim 1, wherein the reflective device comprises one of a tetrahedral reflective device and a flat plate reflective device.

4. The portable anechoic chamber in accordance with claim 1, wherein the housing further comprises a mounting point configured to mount the housing to a movable unit.

5. The portable anechoic chamber in accordance with claim 1, wherein the interior has a volumetric capacity of less than about 1 cubic meter.

6. The portable anechoic chamber in accordance with claim 1, wherein the opening is oriented to provide line of sight from exterior of the housing to the reflective device positioned within the interior.

7. The portable anechoic chamber in accordance with claim 1, wherein the housing comprises a side wall and a side wall extension that defines the opening, the side wall extension oriented obliquely relative to the side wall such that the opening has a greater cross-sectional area than the interior.

8. A method of calibrating a radar system, said method comprising:
    positioning a vehicle at a predetermined location, wherein the vehicle includes a plurality of radar sources
    positioning a plurality of anechoic chambers about the predetermined location, wherein at least one anechoic chamber is aligned with at least one of the plurality of radar sources, and wherein the at least one anechoic chamber includes:
        a housing including an interior, the housing defining an opening sized to provide access to the interior;
        a layer of radar absorbent material lining the interior; and
        a reflective device positioned within the interior, wherein the reflective device is positioned to receive and reflect a radar beam emitted from the at least one radar source;
    orienting at least one of the housing of the at least one anechoic chamber or the at least one radar source, such that a line of sight is provided between the at least one radar source and the reflective device through the opening; and
    performing a calibration sequence for the at least one radar source.

9. The method in accordance with claim 8 further comprising:
    determining a calibration distance between the at least one radar source and the reflective device for performing the calibration sequence, wherein the calibration distance is greater than the physical distance; and
    adjusting, with the reflective device, a frequency of the radar beam such that a perceived distance between the at least one radar source and the reflective device is approximately equal to the calibration distance.

10. The method in accordance with claim 8, wherein the positioning the plurality of anechoic chambers comprises moving the at least one anechoic chamber relative to the at least one radar source.

11. The method in accordance with claim 10, wherein moving the at least one anechoic chamber comprises:
    mounting the at least one anechoic chamber to a movable unit; and
    moving the at least one anechoic chamber with the movable unit.

12. The method in accordance with claim 8, wherein positioning the plurality of anechoic chambers comprises positioning the plurality of anechoic chambers at fixed locations about the predetermined location.

13. The method in accordance with claim 10, wherein positioning the at least one radar source comprises moving the at least one radar source to a predetermined location along a manufacturing line.

14. A radar calibration system comprising:
    a movable unit; and
    an anechoic chamber coupled to the movable unit, the anechoic chamber comprising:
        a housing comprising an interior, the housing defining an opening sized to provide access to the interior;
        a layer of radar absorbent material lining the interior; and a reflective device positioned within the interior, wherein the reflective device includes an analog delay module positioned to receive and reflect a radar beam emitted from a radar source, and wherein the analog delay module adjusts a frequency of the radar beam.

15. The radar calibration system in accordance with claim 14, wherein the analog delay module is configured to receive the radar beam from the radar source that is spaced a physical distance from the reflective device, and wherein the analog delay module adjusts the frequency of the radar beam such that a perceived distance between the radar source and the reflective device is greater than the physical distance.

16. The radar calibration system in accordance with claim 14, wherein the reflective device comprises one of a tetrahedral reflective device and a flat plate reflective device.

17. The radar calibration system in accordance with claim 14, wherein the housing further comprises a mounting point configured to mount the housing to the movable unit.

18. The radar calibration system in accordance with claim 14, wherein the movable unit comprises a six-axis robot or a wheeled mobile platform.

* * * * *